(12) United States Patent
Bauer (10) Patent No.: US 10,005,243 B2
(45) Date of Patent: Jun. 26, 2018

(54) METHOD FOR PRODUCING A FIBRE COMPOSITE COMPONENT BY MEANS OF A VACUUM BUILD-UP, AND USE THEREFOR

(71) Applicant: Premium AEROTEC GmbH, Augsburg (DE)

(72) Inventor: Ernst-Joachim Bauer, Bad Aibling (DE)

(73) Assignee: Premium AEROTEC GmbH, Augsburg (DE)

( * ) Notice: Subject to any disclaimer, the term of this patent is extended or adjusted under 35 U.S.C. 154(b) by 595 days.

(21) Appl. No.: 14/403,366

(22) PCT Filed: May 27, 2013

(86) PCT No.: PCT/DE2013/000282
§ 371 (c)(1),
(2) Date: Nov. 24, 2014

(87) PCT Pub. No.: WO2013/174366
PCT Pub. Date: Nov. 28, 2013

(65) Prior Publication Data
US 2015/0097320 A1    Apr. 9, 2015

(30) Foreign Application Priority Data
May 25, 2012    (DE) .................. 10 2012 010 271

(51) Int. Cl.
*B29C 70/44*    (2006.01)
*B29C 70/46*    (2006.01)
(Continued)

(52) U.S. Cl.
CPC ............ *B29C 70/44* (2013.01); *B29C 70/443* (2013.01); *B29C 70/446* (2013.01); *B29C 70/46* (2013.01);
(Continued)

(58) Field of Classification Search
CPC ......... B29C 70/34; B29C 70/36; B29C 70/44; B29C 70/48; B29C 70/78; B29C 35/0266
See application file for complete search history.

(56) References Cited

U.S. PATENT DOCUMENTS 3,080,253 A * 3/1963 Dietz .................... B05D 7/222
138/146
3,648,358 A * 3/1972 Cannady, Jr. ......... B30B 15/062
29/527.4
(Continued)

FOREIGN PATENT DOCUMENTS

DE    10 2005 020 274 A1    11/2006
DE    10 2006 043 688 A1    3/2008
(Continued)

OTHER PUBLICATIONS

International Search Report (PCT/ISA/210) dated Dec. 3, 2013, with English translation (Five (5) pages).

*Primary Examiner* — Matthew J Daniels
*Assistant Examiner* — Andrew D Graham
(74) *Attorney, Agent, or Firm* — Crowell & Moring LLP (57) ABSTRACT

A fiber composite component is made by infiltrating and curing at least one textile component preform that is placed on a molding tool surface and covered with an air-tight covering and on which pressure is exerted, in at least one stage of production, by evacuating a vacuum chamber between the molding tool surface and the air-tight covering. The air-tight covering is formed from a resin film.

10 Claims, 5 Drawing Sheets

(51) Int. Cl.
*B29L 22/00* (2006.01)
*B29L 31/00* (2006.01)

(52) U.S. Cl.
CPC .......... *B29C 70/465* (2013.01); *B29C 70/467* (2013.01); *B29L 2022/00* (2013.01); *B29L 2031/772* (2013.01)

(56) References Cited

U.S. PATENT DOCUMENTS

| | | | | | |
|---|---|---|---|---|---|
| 3,953,622 | A * | 4/1976 | Wismer | .................. | C08F 2/48 427/170 |
| 4,178,336 | A * | 12/1979 | Snowden | .................. | D01F 6/76 264/12 |
| 4,227,779 | A * | 10/1980 | Bissar | .................. | G02F 1/161 156/145 |
| 4,323,524 | A * | 4/1982 | Snowden | .................. | D01F 6/76 264/12 |
| 4,702,376 | A * | 10/1987 | Pagliaro | .................. | A47L 9/14 206/524.8 |
| 5,096,748 | A * | 3/1992 | Balassa | .................. | A01N 25/10 106/12 |
| 5,431,500 | A * | 7/1995 | Harris | .................. | B29C 53/586 384/206 |
| 5,433,165 | A * | 7/1995 | McGuiness | .................. | B29C 70/443 114/357 |
| 5,529,820 | A * | 6/1996 | Nomi | .................. | A61L 29/041 428/36.4 |
| 5,688,851 | A * | 11/1997 | Kress | .................. | B29C 37/0032 523/171 |
| 5,955,013 | A * | 9/1999 | Grinshpun | .................. | B29C 44/04 264/255 |
| 7,709,579 | B2 * | 5/2010 | Lehmann | .................. | C08G 12/08 264/299 |
| 2002/0198342 | A1 * | 12/2002 | Kessler | .................. | C08F 32/00 526/172 |
| 2003/0042659 | A1 * | 3/2003 | Benson | .................. | B29B 15/122 264/510 |
| 2004/0046291 | A1 * | 3/2004 | Johnson | .................. | B29C 70/342 264/510 |
| 2004/0140587 | A1 * | 7/2004 | Hadley | .................. | B29C 35/0266 264/257 |
| 2005/0086916 | A1 * | 4/2005 | Caron | .................. | B29C 43/12 55/382 |
| 2005/0161154 | A1 * | 7/2005 | Anderson | .................. | B29C 70/34 156/278 |
| 2005/0253309 | A1 * | 11/2005 | Hou | .................. | B29C 35/02 264/571 |
| 2006/0244179 | A1 * | 11/2006 | Denk | .................. | B29C 70/446 264/257 |
| 2007/0102110 | A1 * | 5/2007 | Yuba | .................. | B29C 45/14811 156/285 |
| 2007/0194475 | A1 * | 8/2007 | Wilenski | .................. | B29C 70/44 264/40.6 |
| 2007/0244268 | A1 * | 10/2007 | Usui | .................. | C08G 59/18 525/524 |
| 2008/0106007 | A1 * | 5/2008 | Kipp | .................. | B29C 41/08 264/571 |
| 2008/0251975 | A1 * | 10/2008 | Gallagher | .................. | B29C 33/0011 264/571 |
| 2008/0277049 | A1 * | 11/2008 | Roebroeks | .................. | B29C 33/04 156/221 |
| 2009/0008836 | A1 * | 1/2009 | Kaps | .................. | B29C 66/1122 264/511 |
| 2010/0163167 | A1 * | 7/2010 | Maheshwari | .................. | B29C 70/545 156/245 |
| 2010/0163174 | A1 * | 7/2010 | Calder | .................. | B29C 70/48 156/285 |
| 2010/0193115 | A1 * | 8/2010 | Inserra Imparato | .. | B29C 70/342 156/245 |
| 2010/0196637 | A1 * | 8/2010 | Lippert | .................. | B29C 70/345 428/36.1 |
| 2010/0233146 | A1 * | 9/2010 | McDaniel | .................. | A01N 63/02 424/94.2 |
| 2010/0283180 | A1 * | 11/2010 | De Vita | .................. | B29C 67/0037 264/258 |
| 2011/0059295 | A1 * | 3/2011 | Greer | .................. | G02B 5/128 428/149 |
| 2011/0151179 | A1 * | 6/2011 | Batge | .................. | B29B 11/16 428/102 |
| 2011/0272086 | A1 * | 11/2011 | Dittman | .................. | B29C 33/485 156/155 |
| 2011/0272852 | A1 * | 11/2011 | Blot | .................. | B29C 33/48 264/257 |
| 2012/0038081 | A1 * | 2/2012 | Kendall | .................. | B29C 43/18 264/257 |
| 2012/0064788 | A1 * | 3/2012 | Peters | .................. | B29C 70/22 442/173 |
| 2012/0093659 | A1 * | 4/2012 | Muschke | .................. | B29C 70/086 416/241 R |
| 2014/0346715 | A1 | 11/2014 | Lengsfeld et al. | | |

FOREIGN PATENT DOCUMENTS

| | | |
|---|---|---|
| DE | 10 2007 015 909 A1 | 10/2008 |
| DE | 10 2007 060 029 A1 | 6/2009 |
| DE | 10 2009 004 394 A1 | 7/2010 |
| WO | WO 2006/070267 A1 | 7/2006 |

* cited by examiner

METHOD FOR PRODUCING A FIBRE COMPOSITE COMPONENT BY MEANS OF A VACUUM BUILD-UP, AND USE THEREFOR

BACKGROUND AND SUMMARY OF THE INVENTION

Exemplary embodiments of the present invention relate to a method for producing a fiber composite component and to the use of the method.

Such methods, in which the fiber composite component is produced by infiltrating and curing of at least one textile component preform, wherein in at least one stage of the method pressure is exerted on the preform by means of an air-tight covering that covers the preform, are known from the prior art in many embodiments and are normally called "vacuum-supported" methods.

In the known methods for producing a fiber composite component (e.g. carbon fiber-reinforced plastic component), often a variety of supplementary agents or functional layers are required that become waste after the method has concluded. The known vacuum-supported methods include the required air-tight covering in the form of a plastic film.

Moreover, the pre-production of such plastic films, along with their handling as a (non-reusable) supplementary agent in the component production, represents a not insignificant portion of the production time and costs.

Finally, the use of plastic films in the production of a complicated shaped fiber composite component is frequently problematic or even unsuitable (e.g. for hollow components).

Accordingly, exemplary embodiments of the present invention are directed to a novel way to realize the "air-tight covering" in a production method of the type cited in the foregoing, and thus to reduce or eliminate in particular the aforesaid problems.

Proceeding from a method of the aforesaid type, this object is inventively attained in that the air-tight covering is formed from a resin film.

The resin film may be a cross-linkable thermoset plastic, in particular e.g. an epoxide resin system. This may be a material as is known per se from the field of fiber composite technology as "matrix material" for infiltrating a fiber material. Suitable materials are well known from the prior art and may be produced synthetically using polymerization, polyaddition, or polycondensation reactions. At least at the time of the application or addition of the resin film in the inventive "vacuum structure," this resin film preferably has a liquid to semi-liquid consistency. In accordance with one preferred embodiment, the resin used for forming the resin film comprises at least two principle components, specifically the actual resin material that may be cured, e.g. by cross-linking and a curing agent that accomplishes or accelerates the curing process ("reaction resin"). In addition to resin materials based on epoxide resin (e.g. "RTM6" or the like), vinyl ester resins, phenol resins, or polyester resins may for instance also be used in the context of the invention, whether as material for the resin film and/or as matrix material for the textile component preform to be infiltrated.

If the resin film (e.g. an epoxide resin system) remains on the cured preform at the end of the production process, the waste formed in the prior art by the plastic films is advantageously prevented. The same is true if the resin film is used as such for infiltrating the preform disposed thereunder. Moreover, the invention provides a logistical advantage in that is implemented as devices for handling (conditioning, feeding, etc.) resin as "matrix material" of the fiber composite component to be in production devices in the type of interest here. In other words, when the invention is used it is not necessary to purchase and possibly adjust any plastic films; on the contrary, it is advantageously possible to use resin material that is already present, e.g. for infiltrating the preform, or that is additionally supplied for forming the resin film in system parts that are available per se.

Important parameters when selecting the resin may be e.g.: melting point, viscosity, reactivity, fusion temperature, and curing conditions.

With respect to the design of the preform (e.g. fabric, roving, meshwork, etc. made of fiber material), in the context of the invention known designs in the field of fiber composite technology may be used. The preform may be a single-layer preform or a multilayer preform ("laminate"). The preform may be "dry" or may already be pre-impregnated ("prepreg") with matrix material (e.g. resin system).

As will become very clear, especially from the description of the exemplary embodiments, the inventive formation of the air-tight covering from a resin film surprisingly also provides useful options for vacuum-supported production of complicated fiber composite components, especially e.g. hollow components.

Moreover, the invention is advantageously compatible with the production principles for a number of established methods in fiber composite technology.

Thus, for instance, autoclave production, infiltration techniques such as VAP, hand lay-up methods, etc., as a rule are based on an external pressure acting on the covered preform to prevent porosities in the matrix and to attain favorable fiber volume. In the prior art, this is attained using a vacuum structure while employing the aforesaid plastic films as air-tight coverings. The inventive substitution of a resin film for the known plastic films permits the continued use of these known production principles and as stated in the foregoing furthermore provides additional advantages.

For instance, the chemical family of epoxide resins covers a large spectrum of reactivity, viscosity, and other physical properties. Such epoxide resins and other resin systems already used in fiber composite technology may be obtained in a wide range of designs and states, so that in the context of the invention a suitably air-tight film may be advantageously formed by selecting an appropriate resin. The fact that controlling pressure and temperature during the course of the production process provides the opportunity to deliberately influence in particular the consistency or viscosity of such resins is of substantial benefit for realizing the invention.

In series production of fiber composite components in accordance with the invention, the cycle times will be a function of the properties of the resin from which the covering resin film is formed (e.g. viscosity of the resin and its curing time). How long the tool is used is thus determined by such parameters. One estimate in this regard found that advantageously shorter cycle times than for the conventional methods could be attained with the inventive method.

In one embodiment the resin film is applied to the preform in the liquid to semi-liquid state.

The resin used may be a temperature-curing resin and/or epoxide resin system, whether e.g. a two-component resin or merely one resin component (e.g. pure epoxy chains).

Advantageously the resin may be applied with current film-applying surface techniques, e.g. by coating, spraying, rolling, smearing, applying by knife, or the like.

A suitable selection of the resin material and/or the "environmental conditions" (in particular on the free surface of the resin film), such as e.g. in particular temperature, humidity, etc., it is possible to ensure that the resin layer applied for instance directly to a preform surface already represents as it is, i.e. without further modification (e.g. without a change in consistency) an air-tight coating. Alternatively or in addition it is possible to change the environmental conditions of the aforesaid type after applying the resin in order to further improve (or to provide) gas-tightness of the resin film according to the specific resin material used.

In one embodiment the resin film is used in a "carrier-stabilized" form. In one special embodiment, to this end the resin film is initially pre-produced in a carrier-stabilized manner so that it is then placed onto the preform.

The term "carrier-stabilized" is intended to mean that the resin in question is first combined, not as is, but rather for instance in a separate pre-production process, with a carrier medium (e.g. made of fiber material). For instance, the carrier medium for this may be impregnated with the resin and where necessary pre-formed and/or cut and/or somewhat consolidated (e.g. using thermal partial curing), for instance to render the resin film easier to handle if it is a separately pre-produced carrier-stabilized resin film. Such a carrier-stabilized resin film is then first in the form of a separate semi-finished product so that it may then be placed e.g. directly onto the surface of the preform arranged on the tool (alternatively, e.g. a functional layer could also be added between preform and resin film).

As an alternative to separate pre-production of the carrier-stabilized resin film, e.g. first a carrier medium (e.g. dry fiber non-woven fabric) may be placed on the pre-form and then the resin may be applied, in a liquid to semi-liquid state, to the carrier medium such that the carrier medium is impregnated with the resin.

Regardless of whether the resin film forming the air-tight covering comprises only resin material or is used as a carrier-stabilized resin film, in accordance with one embodiment the consistency of the applied or placed resin film is deliberately influenced during the course of the production process by adjusting environmental parameters, such as for instance temperature or humidity, and/or by adding a catalyst.

In one embodiment such deliberate influence on the consistency is provided at least one time, and specifically at a time after the resin film has been applied or placed, but before the evacuation of the vacuum chamber embodied between resin film and tool surface.

In particular the addition of a catalyst is a simple and reliable option for causing the creation or stabilization of gas-tightness in a desired stage of the production method (e.g. during the infiltration of the preform) with a resin that is initially present in the liquid or semi-liquid state.

For instance, adding a catalyst that accelerates the otherwise very slow consolidation process or a consolidation process that otherwise occurs only at relatively high temperatures may have a desirable influence on the resin consistency.

In one refinement a catalyst is effectively used essentially only on the free resin film surface, i.e. the resin film surface facing away from the pre-form, so that essentially only the outermost surface areas of the resin film are cured or are cured more rapidly.

The latter refinement is possible, for instance, for an embodiment in which the preform is infiltrated using (at least some of) the resin film itself. The use of at least some of the resin material, which is inventively used in any case as an air-tight covering, as an "infiltration material" (matrix material) for the preform, as well, has the advantages e.g. that the preform is then infiltrated transverse to the preform plane, and thus rapidly, and that material of the resin film has an additional use, specifically as matrix material for the component to be produced.

In a more specific embodiment the preform is infiltrated using the resin film that is liquefied after the vacuum chamber is evacuated. Depending on the specific resin (system) selected, this liquefaction of the resin film may be effected e.g. using a deliberate increase in temperature.

In one preferred embodiment of the use of resin material of the resin film for infiltrating the preform is produced with a "resin excess." To minimize porosity in the finished components, it is also possible to add, between the molding tool surface in question and the preform, e.g. an open-pored sacrificial layer that adds air and thus continues the negative pressure and that also may absorb residual air and/or excess resin (e.g. peel-ply, VAP membrane, or the like).

Alternatively or in addition to the use of resin material of the resin film for infiltrating the preform, this infiltration can occur in the "classic" manner, specifically using separately supplied resin. In this case it is generally advantageous when a so-called resin distribution medium (e.g. fiber non-woven fabric) is used that is inserted between the preform and the resin film e.g. as a functional layer provided for this. Separately supplied matrix material may flow through such a resin distribution medium in a manner known per se with low flow resistance parallel to the preform surface and after this lateral distribution may then rapidly penetrate (transversely) into the preform.

In one embodiment, for increasing the pressure exerted onto the preform, an autoclave (pressure chamber) is used in which the arrangement ("vacuum structure"), comprising tool surface, preform, and covering, is housed.

Apart from the use of such a pressure chamber, which is already known from the prior art, in the context of the present invention the pressure chamber may also be used for simplifying the aforesaid adjustment of the environmental parameters and/or for adding a catalyst for the purpose of deliberately influencing the resin film properties, especially consistency and viscosity. For instance, a gaseous catalyst may be added to the interior of the pressure chamber at a desired stage of the production process. Temperature and pressure (or negative pressure) in particular are physical parameters that may be adjusted in an autoclave for controlling the individual production process steps. A process control may be attained by means of adapting time periods for individual process steps.

As an alternative to a gaseous catalyst, a catalyst in liquid form or e.g. as a powder may also be used. The effect of the catalyst, with nothing further, may remain limited primarily to the exposed resin surface and there ensure that the consolidation (e.g. by polymerization) in this resin area has a head start compared to the underlying resin layers. As stated, these underlying resin layers may be important in the context of the infiltration of the preform (by the resin film material itself).

In one exemplary embodiment the resin film is removed from the cured preform at the end of the production method. Alternatively, it is also possible for the resin film to remain on the cured preform at the end of the method and thus to embody a component of the finished fiber composite component.

It is understood that the specific selection of the matrix material (e.g. epoxide resin system) and also of the fiber material (e.g. fibers made of carbon, glass, synthetic plastic, etc.) is of lesser importance for the fiber composite component in the context of the invention. In one embodiment, the component to be produced is a carbon fiber-reinforced plastic component.

In addition to the aforesaid increases in temperature, in the context of the invention it is also possible to provide cooling in at least one method step in order to deliberately influence the resin film and/or the preform.

Another very advantageous use of the described method is the production of a(n) (open or closed) hollow component by infiltrating and curing, for instance, two or more component preforms in a suitable tool (having a cavity in the tool). During the production of such hollow components, it is advantageously possible by means of the invention to do without the use of relatively complex tools, specifically a "mold core." Instead, the aforesaid air-tight covering or the resin film may be provided on the interior of the overall hollow preform arrangement to embody an air-tight separation surface that is required to realize the vacuum and/or pressure support and that separates an "interior pressure chamber" from an "exterior vacuum chamber" during production of hollow components.

BRIEF DESCRIPTION OF THE DRAWING FIGURES

The invention shall be described in greater detail in the following using exemplary embodiments, with reference to the attached drawings.

FIGS. 2 and 3 depict the use of a premade carrier-stabilized resin film in a method for producing a fiber composite component in accordance with another exemplary embodiment, wherein

DETAILED DESCRIPTION

Figure 1:
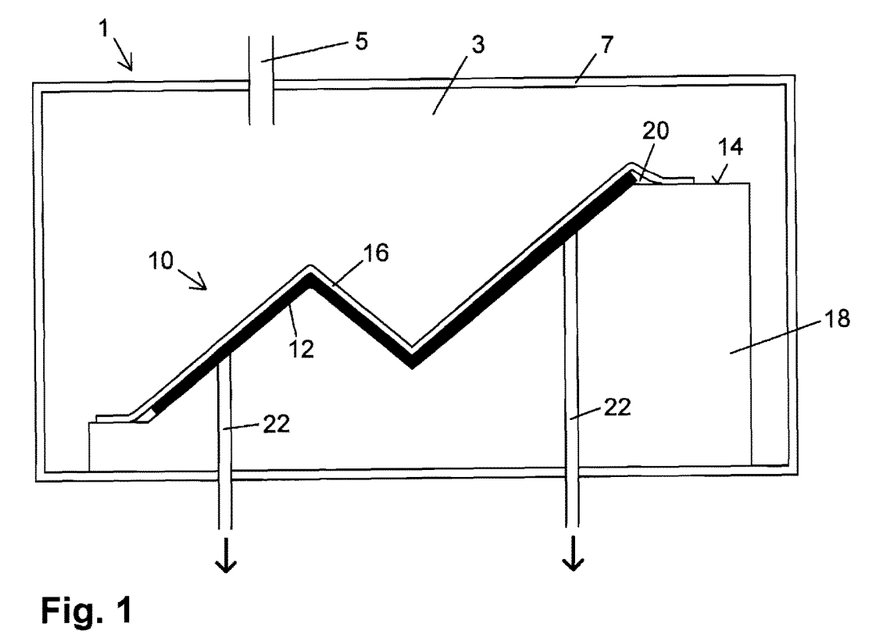
FIG. 1 depicts the use of a resin film as an air-tight covering in a vacuum structure for producing a fiber composite component in accordance with a first exemplary embodiment.

FIG. 1 illustrates the use of a "vacuum structure" 10, arranged in an autoclave 1, for producing a fiber composite component by infiltrating and curing a textile component preform 12.

The component preform 12 in the depicted example is placed directly on a molding tool surface 14 and covered with an air-tight covering in the form of a resin film 16. In the example depicted, the resin film 16 is disposed directly on the surface of the preform 12.

The air-tight covering (resin film 16), the preform 12, and the tool surface 14 of a tool part 18 together form the aforesaid vacuum structure 10, in which, using a covering running on the edge of the resin film 16 to the tool surface 14, an evacuatable space is formed between the resin film 16 and the tool surface 14, which evacuatable space is referred to hereinafter as "vacuum chamber" 20 and in which the preform 12 is disposed.

Thus, (completely or partially) evacuating this vacuum chamber 20 permits pressure to be exerted on the preform 12 in a manner known per se, and this pressure compacts the preform 12 in a desired manner and shapes the latter by pressing it against the tool surface 14.

In the example shown, the evacuation is performed via suitable vacuum passages 22 that are connected to a pump device (not shown) and that pass through the tool part 18.

To increase the pressure exerted on the preform 12, the pressure may be increased or adjusted as desired in an interior space in the autoclave 1, hereinafter referred to as "pressure chamber" 3, by means of a compressor (not shown). This pressure adjustment is made via a pressure chamber port 5 that, like the vacuum passage 22, passes through a pressure chamber wall 7.

As stated, one special feature that distinguishes the depicted vacuum structure 10 from the prior art for fiber composite technology is comprised in that the air-tight covering and the required gas-tight separation surface between vacuum chamber 20 and exterior (here: pressure chamber 3) is formed by the resin film 16. Thus it is possible, with or without the use of the autoclave 1, to evacuate the vacuum chamber 20 in a simple manner to exert pressure on the preform 12. In the prior art, a complicated pre-produced plastic film ("vacuum film") was used as the air-tight covering for such production methods and remained as waste at the end of the component production.

It should be noted at this point that the generation of a negative pressure in the area of the preform 12 may also naturally be advantageously used, as in the corresponding known vacuum-supported methods of fiber composite technology, to "suction" liquid matrix materials (e.g. resin material such as e.g. epoxide resin) into the preform 12, if the preform 12 is not a preform that has already been pre-impregnated (so-called prepreg).

The aforesaid basic principle explained with reference to FIG. 1, that is, the use of a resin film for forming a needed air-tight covering during fiber composite production, permits numerous more specialized embodiments, for instance with respect to specifically how the resin film 16 is brought into the depicted configuration, how the required gas-tightness that is necessary for the "evacuation stage" of the method is created or promoted, and how the possibly necessary infiltration of the preform 12 is accomplished.

A first special exemplary embodiment shall now be explained, again with reference to FIG. 1:

After the preform 12 (e.g. including at least a fabric, roving, meshwork, or the like made of fiber material) has been placed directly on the tool surface 14, or has been placed on the tool surface with the interposition of other preforms or other "functional layers," liquid to semi-liquid resin material is applied to the preform 12 on the side facing away from the tool surface 14. The quantity of resin may be measured such that it is sufficient for completely coating, i.e. later infiltrating, the preform 12, which is initially dry, the consistency of the applied resin material (e.g. semi-liquid) preventing the material from penetrating significantly into the preform.

In a second step, the applied resin material is caused to become even more viscous, especially e.g. a semi-solid state, to create a gas-tight coating, that is, the "air-tight" covering, on the preform surface. In particular the temperature in combination with the physical properties of the resin used in its initial state are available as control parameters to attain the desired state. Especially for this second step, the use of the autoclave 1 provides advantages in that in particular e.g. the process of heating the applied resin is simplified.

In a third step, after the gas-tight resin coating has been created in the form of a resin film 16, the vacuum chamber 20 is placed under negative pressure using the vacuum passages 22, i.e. it is partially or completely evacuated.

A fourth step, specifically infiltrating the preform 12, may now be accomplished for instance using sufficient liquefaction of resin material of the resin film 16, in order to rapidly infiltrate the preform 12 with the resin material of the resin film 16 itself, specifically transverse to the preform surface. This fourth step may be realized by increasing the temperature of the resin film material to an infiltration temperature at which the resin material is sufficiently liquefied. Infiltration may also be supported or accelerated using the pressure prevailing in the pressure chamber 3.

In a fifth step the temperature is further increased, which cures the resin, so that the production process is essentially concluded.

In summary, in this manner of performing the method, e.g. first a quantity of resin that is required for completely impregnating a preform is applied as a gas-tight resin coating to the free preform surface without penetrating significantly into the preform. The infiltration, and finally the final curing of the component, does not occur until the temperature is elevated and until there is a pressure difference between vacuum chamber and exterior generated by the evacuation and/or pressure.

One modification of the aforesaid production method described with reference to FIG. 1 is for a resin applied as a semi-liquid and thus forming the resin film 16 already to be immediately sufficiently gas-tight for the intended purpose here, that is, for it not to require appreciable curing first.

Another modification is comprised in that, for stabilizing the gas-tightness, preferably even prior to or during heating of the resin in accordance with the "second step" explained in the foregoing, a catalyst is added to the free surface of the resin film 16 in order to deliberately influence the consistency of the resin film 16 or the change in this consistency during the course of temperature changes so that the gas-tightness is promoted. This surface addition of a catalyst (e.g. in gaseous form via the pressure chamber port 5) may e.g. lead to a relatively thin layer somewhat gelling or curing on the surface of the resin film 16 so that no defects in the tightness occur or such defects are eliminated in the subsequent heating process. In this latter respect, the catalyst may be used e.g. so that the surface layer cures before the other resin of the resin film 16.

With respect to the exemplary embodiments described, up to now with reference to FIG. 1, it may be stated that because a pressure chamber, such as e.g. the aforesaid autoclave 1, is used, it is possible to create suitable functional conditions in a simple manner for the production method. Thus it is possible to ensure that conditions appropriate for infiltration are provided in the interior 3 of the autoclave 1 (pressure, temperature, humidity, chemistry, etc.).

In accordance with one preferred embodiment, the resin film 16 is formed by a temperature-curing two-component resin, for instance by an epoxide resin system.

In the following description of other exemplary embodiments, the same reference numbers are used for equivalent components, with the addition of a lowercase letter to distinguish the embodiment. Essentially only differences from the exemplary embodiment(s) already described are explained; the description of preceding exemplary embodiments is hereby expressly referenced.

Figure 2:
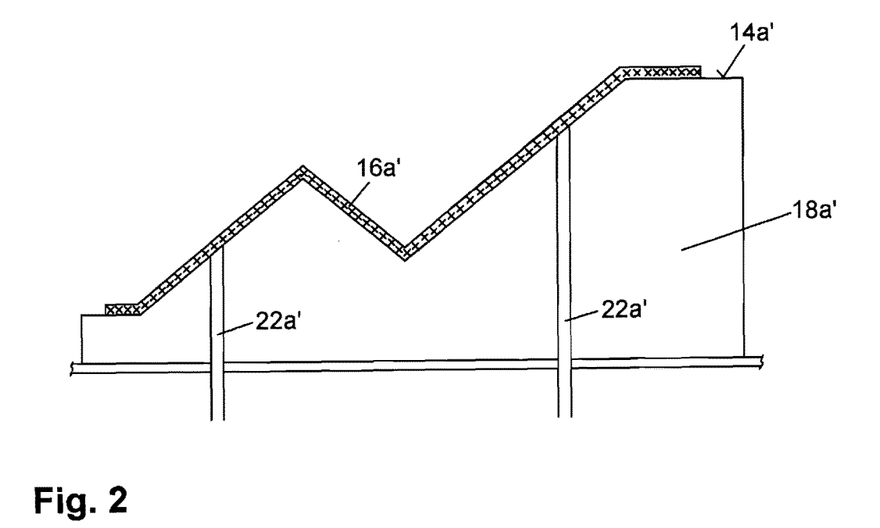
FIG. 2 depicts a carrier medium, initially provided dry.
Figure 3:
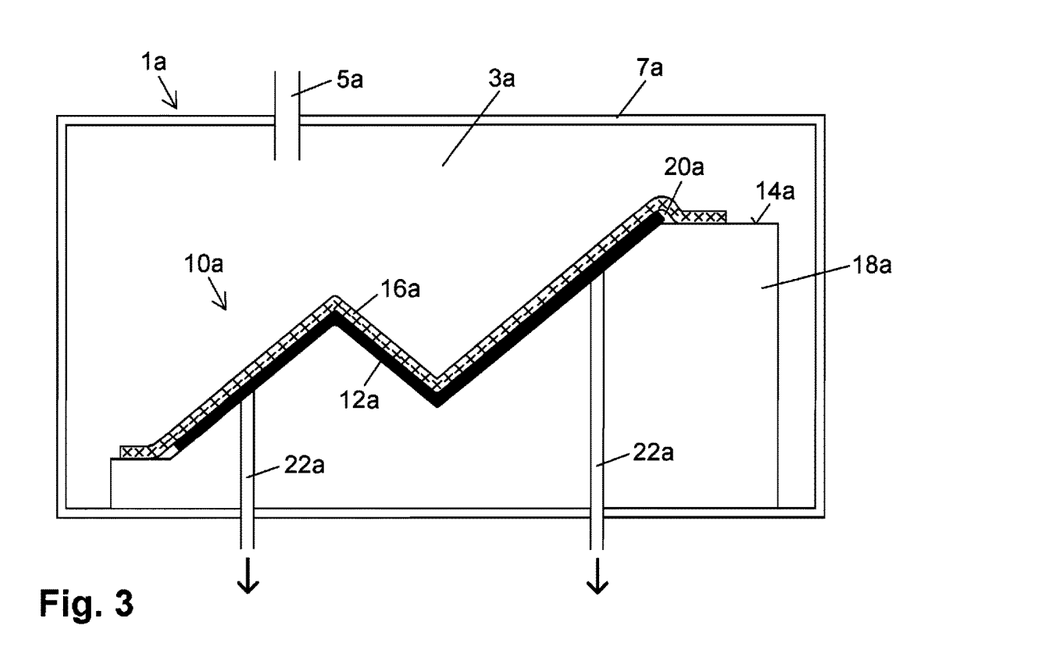
FIG. 3 depicts the use of the resin-impregnated carrier medium as an air-tight covering in a vacuum structure.

FIGS. 2 and 3 illustrate another exemplary embodiment of a method for producing a fiber composite component. As depicted in FIG. 3, in this example a vacuum structure 10*a* that is arranged in an autoclave 1*a* is also used.

In contrast to the example in accordance with FIG. 1, a resin film 16*a* forming the "air-tight covering" is not applied simply in the form of a liquid or semi-liquid resin material, however. Instead, the gas-tight closure of a vacuum chamber 20*a* occurs by applying a pre-produced and carrier-stabilized resin film 16*a*.

FIG. 2 illustrates the separate pre-production of the resin film 16*a*. To this end, in a first step a carrier medium 16*a'* made of fiber material, for instance a fabric, roving, meshwork, or non-woven fabric, is placed on a forming tool surface 14*a'* of a tool part 18*a'* and impregnated with a resin (e.g. two-component resin). The resin that has penetrated into the carrier medium 16*a'* is bonded there. In a second step, the resin-impregnated carrier medium 16*a'* is then partially cured, for instance using an appropriate increase in temperature, in order to finish the pre-production of an easily manageable carrier-stabilized resin film 16*a*.

To make sure the resin bonds well, in particular a medium as is found in the prior art as a so-called "resin distribution medium" may be used for the carrier medium. During the partial curing, the method may again be controlled such that the resin transitions to a semi-solid state. During the pre-production of the carrier-stabilized resin film 16*a*, in particular a "suitable form" is imparted to the resin film 16*a* for its subsequent use as an air-tight covering in the vacuum structure 10*a*.

FIG. 3 depicts the carrier-stabilized resin film 16*a* pre-produced in the manner described in the vacuum structure 10*a*, i.e. covering a component preform 12*a*.

After the carrier-stabilized resin film 16*a* has been applied directly, as depicted in FIG. 3 (or alternatively indirectly, with the interposition of at least one functional layer), to the preform 12*a*, the other steps for producing the fiber composite component may be taken, that is, infiltration and curing, for instance as described in the foregoing referring to FIG. 1.

Transferring the pre-molded and pre-produced carrier-stabilized resin film 16*a* (e.g. applying it to the preform) has the particular advantage that the processing steps for preparing the air-tight covering are to some extent decoupled from the later processing steps (infiltrating and curing the preform 12*a*). In this way it is possible to even better optimize the pre-production of both the air-tight covering (resin film 16*a*) and the later infiltration and curing of the preform 12*a*.

However, even without separate pre-production, carrier stabilization of the resin film 16*a* required for sealing the vacuum chamber 20*a* may be advantageous. In this regard it is possible to have a modified embodiment in which the carrier medium 16*a'* in question is not processed on the separate tool 18*a'* as depicted in FIG. 2, but instead still in the dry state is integrated at once into the vacuum structure 10*a* in accordance with FIG. 3 and is coated with resin material there.

Also in the exemplary embodiment in accordance with FIGS. 2 and 3, and in the modification just cited, the aforesaid adjustment of environmental parameters, such as e.g. temperature and humidity, as well as the addition of a catalyst, may be provided to further process the resin film 16a integrated in the vacuum structure 10a, especially to change its consistency, before infiltration and curing of the preform 12a begins.

It has already been explained for the exemplary embodiment in accordance with FIG. 1 that the infiltration of the preform may be accomplished using material of the covering resin film itself. Alternatively or in addition, however, separate resin supplied in the conventional manner may be used for this infiltration. This option of using or also using this conventional infiltration technique is illustrated in FIG. 4.

FIG. 4 again depicts a vacuum structure 10b for producing a fiber composite component, for instance in the manner already described for FIGS. 1 and 3.

Figure 4:
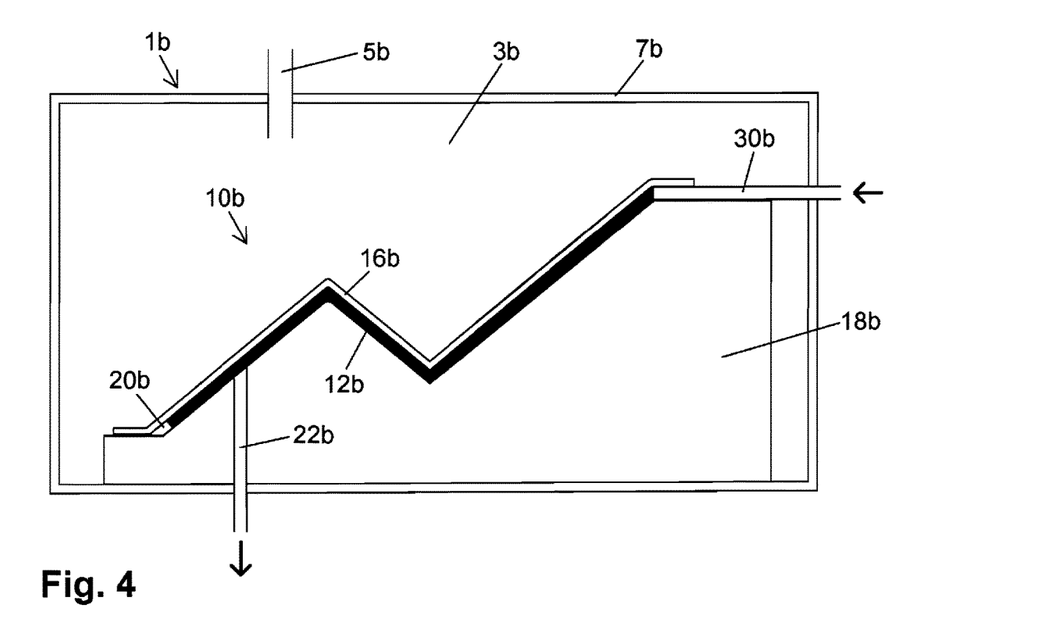
FIG. 4 depicts infiltration of a textile component preform in a vacuum structure, using a separately supplied resin.

In addition, FIG. 4 shows a resin supply passage 30b that opens into a vacuum chamber 20b and via which separate resin is added for infiltrating the preform 12b disposed in the vacuum chamber 20b. As is known from the prior art, in this method step the negative pressure in the vacuum chamber 20b, which negative pressure is produced by evacuation via a vacuum passage 22b, causes the supplied resin to be "suctioned" into the preform 12b.

As far as the provision and any conditioning of the resin film 16b illustrated in FIG. 4 is concerned, in principle all of the options described in the foregoing are available.

Thus, in particular the resin film 16b may be provided for instance using a resin applied to the preform 12b. Alternatively, a resin film that is carrier-stabilized as explained may also be provided.

By means of the structure 10b the preform 12b may then be infiltrated, using vacuum support, with e.g. temperature-curing infiltration resin, wherein the infiltration temperature should be held below the melting point of the material embodying the resin film 16b until the infiltration of the preform 12b has concluded. Then, using another increase in the temperature, e.g. the material of the resin film 16b may be caused to dissolve in the infiltration resin and actively takes part in the subsequent curing process. In this case the resin film 16b becomes an integral component of the finished fiber composite component.

In this special method variant it is provided that the resin film 16b is embodied as a chemical component, e.g. using a pure epoxy chains, that is present at a processing temperature (e.g. room temperature) as a flexible foil-like film. Such a resin film 16b may be modified using suitable adjustment of the temperature (and/or by adding a catalyst) in order to produce a good gas-tight coating. Then the pre-form may be infiltrated below the softening temperature of this "resin film" using an infiltration technique. The subsequent curing is then accomplished above the softening temperature of the resin.

The formation of the air-tight covering from a resin film advantageously permits the use of both basic infiltration principles, i.e. infiltration along the preform, as illustrated as an example with FIG. 4, and also infiltration transverse to the preform surface. In the latter infiltration principle it is advantageous to position a resin distribution medium below the resin film (preferably a single-component resin film), such as is explained, referring to FIG. 5, as an example in the following.

Preferably the inventively employed resin film remains in the component and thus contributes to the performance of the finished component. However, the resin employed does not necessarily represent the total quantity of the matrix volume that is needed for completely impregnating the fiber preform. Any required residual amount is infiltrated in liquid form with vacuum support. One preferred property of the resin film is its chemical compatibility with the liquid matrix medium, which is added by infiltration.

For example, it is possible to add an unbonded epoxide resin in a solid and also in the liquid state. The transition from solid to liquid occurs at a certain temperature. It is possible to seal the preform gas-tight with unbonded epoxide resin to its side facing away from the tool. The preform is thus coated with a layer in the solid state.

During the infiltration with the liquid infiltration resin, the resin film material necessarily comes into contact with the (reactive) infiltration resin. This means that at the appropriate temperature the unbonded resin (e.g. epoxide resin) forming the resin film sets and becomes an integral part of the component.

Figure 5:
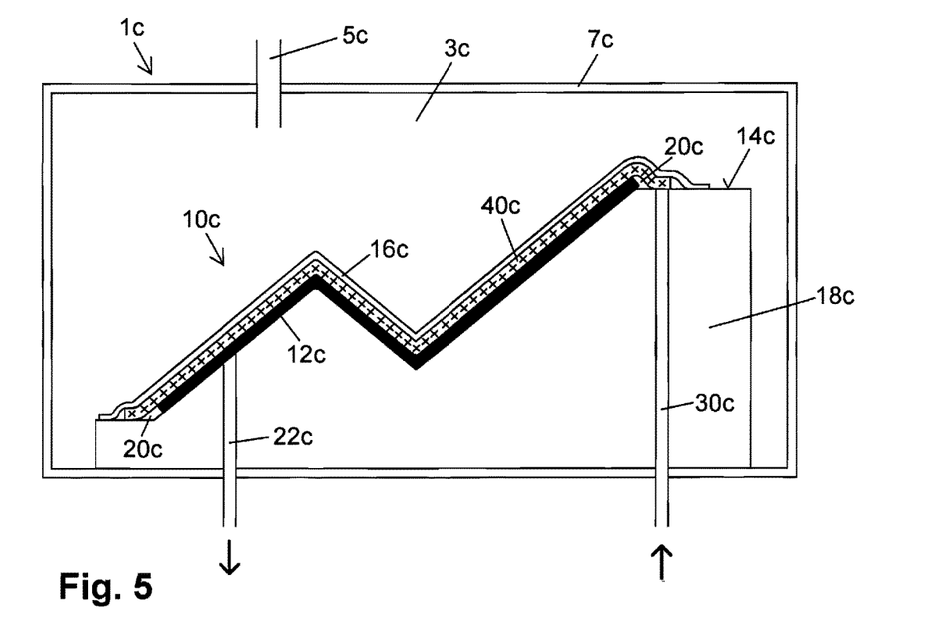
FIG. 5 depicts infiltration of a textile component preform in a vacuum structure, using a liquefied resin film.

FIG. 5 depicts a vacuum structure 10c in which a resin distribution medium 40c is additionally provided that is interposed in a vacuum structure 10c between a resin film 16c and a preform 12c.

In this vacuum structure 10c, infiltration resin may be supplied to the resin distribution medium 40c via a resin supply passage 30c, which infiltration resin then first flows through and impregnates the resin distribution medium 40c, whereupon this resin infiltrates the preform 12c in the transverse direction After the preform 12c has cured, the resin distribution medium 40c may be removed (e.g. pulled off) again, for instance.

The principle of forming the air-tight covering from a resin film in a vacuum structure may also be combined with the use of presses for many component geometries.

Figure 6:
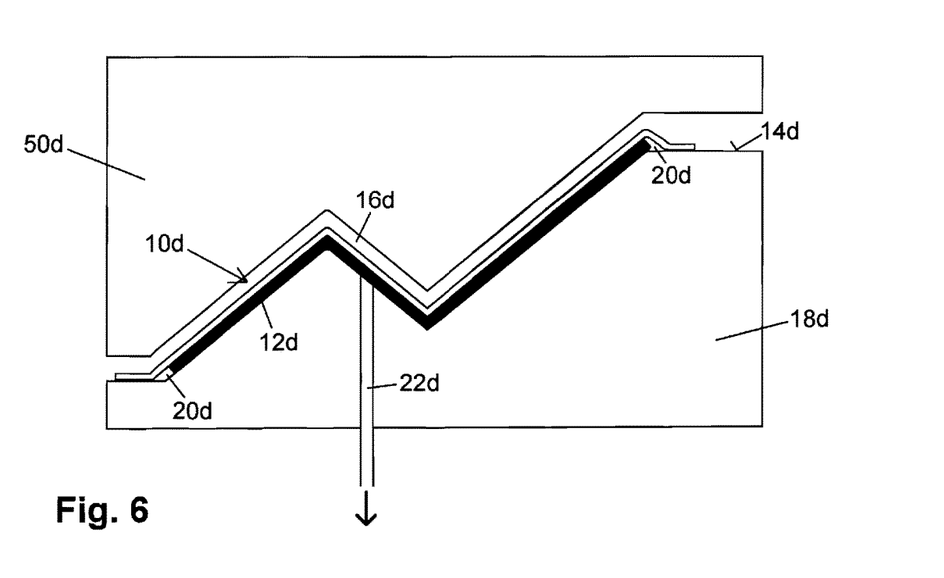
FIG. 6 depicts the use of a press in connection with a vacuum structure for producing a fiber composite component.

For instance, in one embodiment it is provided that a part of a press and/or the surface of a preform placed in the press is coated with liquid to semi-liquid resin so that when the press is closed and the preform is thus molded the resin is pressed into the preform. The press or at least parts thereof are preferably heated during this process. If a vacuum chamber embodied in the press (between resin film and molding press surface) is evacuated at an appropriate point in time, the risk of porosity in the produced component advantageously drops. FIG. 6 illustrates an example of this.

FIG. 6 depicts a vacuum structure 10d of the type described in the forgoing with reference to the aforesaid examples and in which thus a component preform 12d is arranged in a vacuum chamber 20d that is embodied between a covering resin film 16d and a molding tool surface of a tool part 18d (here: the bottom half of a press).

In contrast to the exemplary embodiments described in the foregoing, in the example in accordance with FIG. 6 another tool part (top half of press) 50d may be provided that, together with the first tool 18d, forms a heatable press.

As explained in the foregoing, with the press arrangement depicted in FIG. 6, the preform 12d is infiltrated using the resin film 16d that is liquefied after the vacuum chamber 20d has been evacuated. This liquefaction may be accomplished, depending on the resin material used, e.g. using an increase in temperature, in this case e.g. by heating the top press half 50d appropriately.

Consequently, in the exemplary embodiment in accordance with FIG. 6 the resin coating (resin film 16d) produced in accordance with one of the aforesaid methods is added to the preform with the press 18d, 50d at an elevated temperature and pressure.

The temperature is preferably further increased for the final curing process. The component remains in the mold formed between the press halves 18*d*, 50*d* until it is completely cured.

In a refinement, at least one separate cavity, e.g. depression, is provided in the area of the molding tool surface 14*d* and is suitably embodied for collecting excess resin or porous resin.

Figure 7:
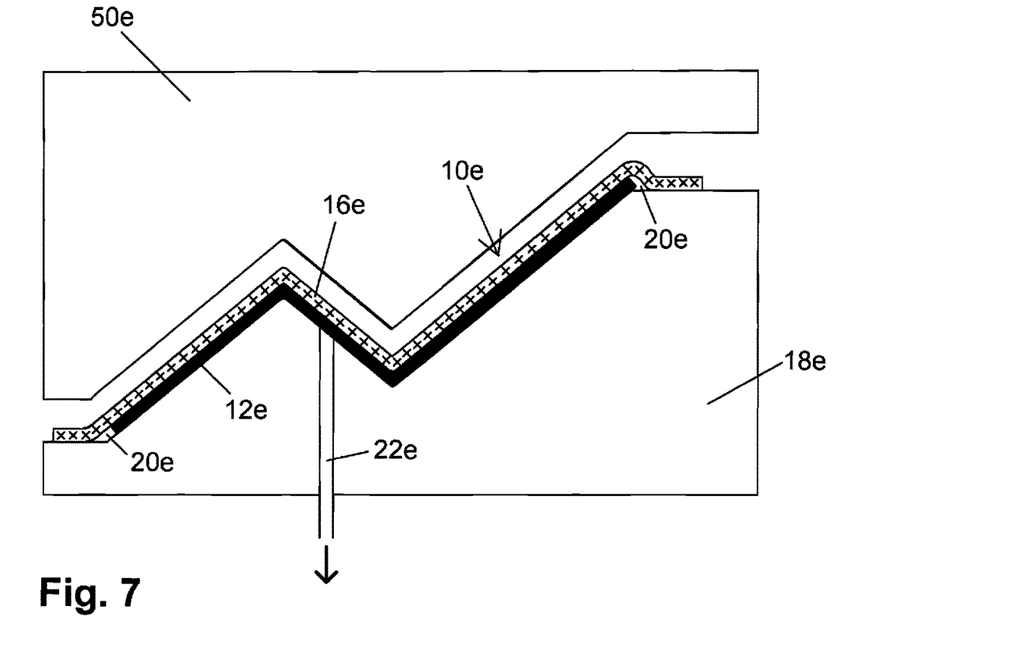
FIG. 7 depicts a modification of the pressing method illustrated in FIG. 6.

FIG. 7 illustrates modified production of a fiber composite component using a press, which in this case is again formed by a first tool part 18*e* and a second tool part 50*e*.

In contrast to the example in accordance with FIG. 6, here a carrier-stabilized resin film 16*e* is provided instead of a "pure resin film." As described in the foregoing, the carrier-stabilized resin film 16*e* may be provided either pre-produced separately or pre-produced in the situation depicted in FIG. 7. In particular a carrier medium made of fiber material, preferably like a type of resin distribution medium, that is impregnated with liquid to semi-liquid resin may be employed here, as well. During separate pre-production, again the resin film 16*e* may be partially consolidated using an increase in temperature so that it may be applied as a pre-produced semi-finished product to the preform 12*e*, which has already been placed on the tool part 18*e* (alternatively, a dry carrier medium may be placed onto the preform 12*e* so that it may be coated with resin in this position (FIG. 7)).

When the press is closed, the infiltrated carrier medium is pressed, and resin penetrates into the preform 12*e*. Once the component has cured, the carrier medium may for instance be removed again (similar to removing so-called peel-plies used in the prior art).

During such a production method, if there is to be an excess of resin, it is useful to provide an appropriate reservoir (added space) in which the excess resin may be collected when the tool 18*e*, 50*e* is closed.

In the exemplary embodiments described thus far, the fiber composite components produced were extended in two dimensions, e.g. they were more or less plate-like fiber composite components. Naturally these methods may be modified in many different ways, in particular with regard to the number, arrangement, and design of one or a plurality of preforms that are processed in the described manner to create a fiber composite component.

The principle of forming an air-tight covering in a vacuum structure may also be used advantageously for producing hollow (chamber) components.

In the prior art, as a rule hollow chamber components are made of at least two shells ("component halves"). When combined, the mold tools used here form a cavity in the tool interior, providing a "solid mold core" in the cavity of such tools, rendering them relatively complex.

In the following, exemplary embodiments shall be described according to which hollow components may be produced in a less complex manner.

Figure 8:
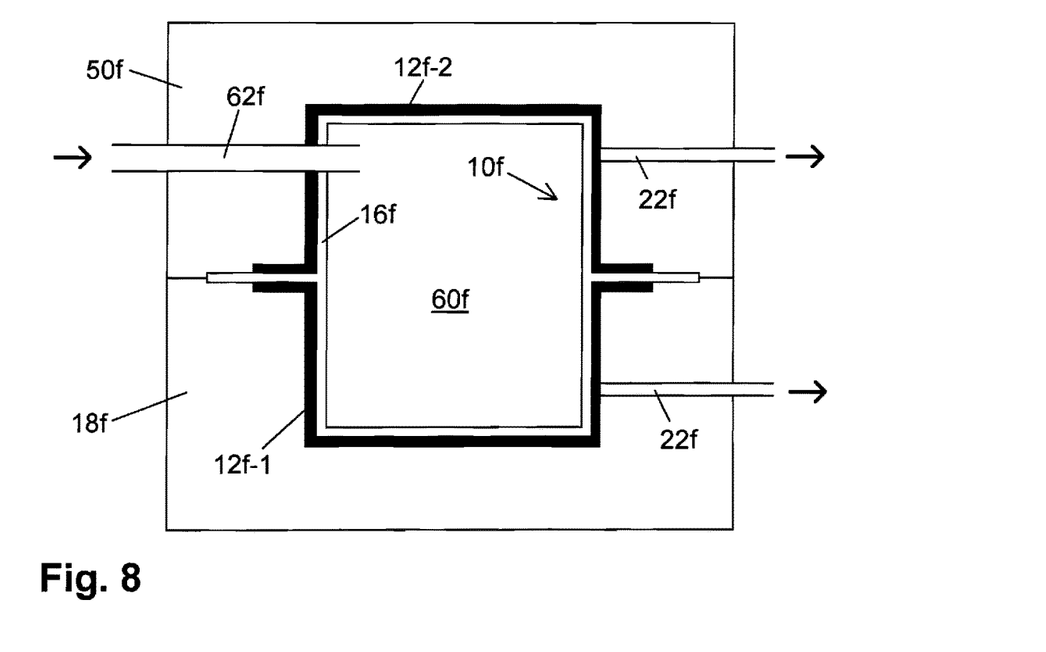
FIG. 8 depicts the use of a resin film as an air-tight covering in a vacuum structure for producing a hollow fiber composite component, in accordance with one exemplary embodiment; and, FIG. 9 depicts a modification to the vacuum structure depicted in FIG. 8 for realizing a similar production method.

FIG. 8 illustrates a method for producing a hollow fiber composite component by infiltrating and hardening a plurality of (in this case: two) component preforms 12*f*-1 and 12*f*-2.

As depicted, these preforms 12*f*-1, 12*f*-2 for forming the hollow component are combined arranged in a cavity 60*f* of a tool 18*f*, 50*f*.

While conventional mold tools of this type have a solid mold core, the special features of the arrangement depicted in FIG. 8 is that pressing the preforms 12*f*-1, 12*f*-2 is again vacuum-supported in that pressure is exerted on these preforms, which are embodied on appropriately molding tool surfaces and covered with a resin film 16*f*, by evacuating a vacuum chamber embodied between the molding tool surfaces and the resin film 16*f*. It is therefore not necessary to have a solid mold core.

Vacuum passages 22*f* that run through the corresponding tool parts 18*f* and 50*f* are provided for evacuating the vacuum chamber formed under the resin film 16*f*.

For creating the vacuum structure 10*f* depicted in FIG. 8, the two tool halves 18*f*, 50*f* are first separately provided with the appropriate preforms 12*f*-1 and 12*f*-2 with the tool open and covered with separate resin films. It is advantageous when, as depicted, each tool part 18*f*, 50*f* has at least one vacuum passage 22*f* for arranging the preforms 12*f*-1, 12*f*-2 individually on the respective tool surfaces and holding them there.

Once the tool has been closed, the situation depicted in FIG. 8 with one single-piece coherent resin film 16*f* occurs. In this situation, the preforms 12*f*-1, 12*f*-2 are infiltrated and cured to produce the hollow component. Conventional methods and methods described in the foregoing referring to the other exemplary embodiments may be used for these final method steps. In particular the use of resin of the resin film 16*f* itself and the use of resin supplied separately for this purpose may be considered for the infiltration (not shown).

As is also shown in FIG. 8, a tool port 62*f* may optionally be provided, that is, a device suitable for influencing pressure and the composition of the medium in the tool cavity 60*f*. This results in the same advantages as for the "pressure chamber port" in the aforesaid exemplary embodiments. In particular applying appropriate pressure to the cavity 60*f* can significantly increase the pressure exerted via the resin film 16*f* onto the preforms 12*f*-1, 12*f*-2. Moreover, the tool port 62*f* again makes it possible to deliberately influence the resin film 16*f*, in particular its consistency, using appropriate adjustment of environmental parameters (temperature, humidity, etc.) and/or by adding a catalyst.

Again, in summary, in the example in accordance with FIG. 8, therefore, each tool component (tool parts 18*f* and 50*f*) is separately provided with a preform (12*f*-1, 12*f*-2) and with a gas-tight covering in the form of a resin layer. Then the tool components are combined and a hollow chamber is created, on whose periphery the preforms are arranged with the now one-piece covering resin layer 16*f*. Infiltration and curing of the hollow component to be produced is initiated, controlled, and accomplished using a suitable combination of negative pressure in the tool cavity 60*f*, temperature and pressure in the cavity.

Figure 9:
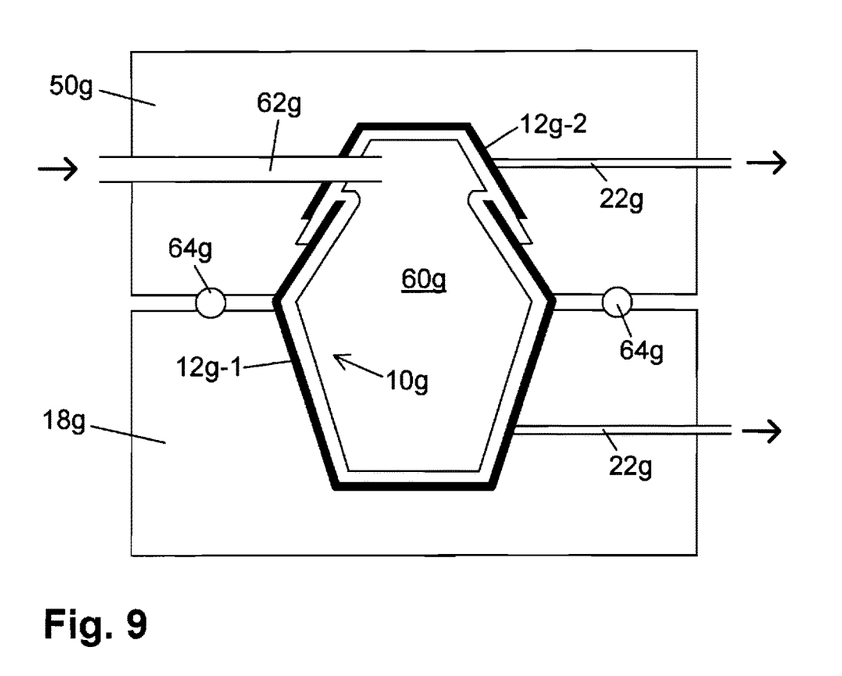

Taking into account any sealing problems, various splices are possible for the preforms used to produce a hollow component in combination with the resin coatings, e.g. a join with an exterior flange or by means of an overlap. FIG. 9 illustrates one exemplary embodiment modified in this way.

FIG. 9 depicts a vacuum structure 10*g*, again with two preforms 12*g*-1 and 12*g*-2, that are combined to create a hollow body in a cavity 60*g* of a molding tool comprising tool halves 18*g*, 50*g*.

In contrast to the exemplary embodiment in accordance with FIG. 8, a peripheral seal 64*g* is provided between the two tool halves 18*g*, 50*g* for sealing. As illustrated, another possible modification is for the respective edges of the first preform 12*g*-1 and of the second preform 12*g*-2 to overlap one another.

Thus, with the invention it is also possible to produce open and closed hollow parts in a simple manner. Closed hollow components are created by combining at least two tool/preform components, wherein an access (see tool ports 62f and 62g) that bridges the preform(s) may be employed very advantageously for controlling the method.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for producing a fiber composite component, the method comprising:
    placing at least one textile component preform on a molding tool surface;
    covering the at least one textile component preform with an air-tight covering formed from a resin film, which is applied as a covering to the at least one textile component preform in a liquid to semi-liquid state;
    adding a catalyst essentially only on a resin film surface facing away from the at least one textile component preform so that outermost surface areas of the resin film are cured or cured more rapidly to create or stabilize a gas-tightness of the resin film;
    exerting pressure on the covered at least one textile component preform, in at least one stage of production, by evacuating a vacuum chamber between the molding tool surface and the air-tight covering; and
    infiltrating and curing the at least one textile component preform, wherein an identical resin material is used for the infiltration and the resin film.

2. The method of claim 1, wherein the resin film is used in a carrier-stabilized form.

3. The method of claim 2, wherein the resin film is pre-produced carrier-stabilized and then applied to the preform.

4. The method of claim 1, wherein a consistency of the applied resin film is deliberately influenced during production by adjusting temperature or humidity.

5. The method of claim 1, wherein the preform is infiltrated using some of the resin film that is liquefied after the vacuum chamber is evacuated.

6. The method of claim 1, wherein the preform is infiltrated using separately supplied resin.

7. The method of claim 1, wherein to increase the pressure exerted onto the preform, a pressure chamber is used in which the molding tool surface, preform, and air-tight covering are housed.

8. The method of claim 1, wherein the resin film is removed from the cured preform at the end of the production method.

9. The method of claim 1, wherein the resin film remains on the cured preform at the end of the production method.

10. The method of claim 1, wherein the cured preform is a hollow component.

* * * * *